US012271742B2

(12) United States Patent
Kuang et al.

(10) Patent No.: US 12,271,742 B2
(45) Date of Patent: Apr. 8, 2025

(54) AUTOMATICALLY EXECUTING APPLICATION ROUTINES WITH USER INPUTS

(71) Applicant: GOOGLE LLC, Mountain View, CA (US)

(72) Inventors: Cliff Kuang, San Francisco, CA (US); Diana Avram, Zurich (CH); Mugurel-Ionut Andreica, Adliswil (CH); Radu Voroneanu, Zurich (CH); Sneha Ashok, San Jose, CA (US); Deepak Goyal, Sunnyvale, CA (US); Kyunghoon Lee, Santa Clara, CA (US); Alice Liang, Sunnyvale, CA (US); Dana Ritter, Horgen (CH); Adam Coimbra, Los Altos, CA (US); Anton Berezin, Zurich (CH); Andre Elisseeff, Basel (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/230,561

(22) Filed: Aug. 4, 2023

(65) Prior Publication Data

US 2025/0045071 A1 Feb. 6, 2025

(51) Int. Cl.
*G06F 9/451* (2018.01)
*G06F 3/0482* (2013.01)
*G06F 3/0484* (2022.01)

(52) U.S. Cl.
CPC ............ *G06F 9/451* (2018.02); *G06F 3/0482* (2013.01); *G06F 3/0484* (2013.01)

(58) Field of Classification Search
CPC ........................... G06F 3/048–05; G06F 9/451
See application file for complete search history.

(56) References Cited

U.S. PATENT DOCUMENTS

| 8,213,875 B1* | 7/2012 | Biere ..................... H04B 17/23 |
| | | 715/708 |
| 10,783,149 B2* | 9/2020 | Osotio .................... G06F 16/26 |
| 11,003,839 B1* | 5/2021 | Hatch ................... G06F 40/166 |
| 2015/0199616 A1* | 7/2015 | Rajendraprasad ..... G06N 20/00 |
| | | 706/12 |
| 2016/0342216 A1* | 11/2016 | Freiberg .............. G06F 3/03547 |
| 2017/0140285 A1 | 5/2017 | Dotan-Cohen et al. |

(Continued)

OTHER PUBLICATIONS

Anonymous; "tkmessagebox-automatic-selection-after-a-timeout"; retrieved from internet: URL:https://stockoverflow.com/questions/51720811/tkmessagebox-automatic-selection-after-a-timeout [retrieved on Nov. 5, 2024]; 3 pages; dated Aug. 7, 2018.

(Continued)

*Primary Examiner* — Daniel Rodriguez
(74) *Attorney, Agent, or Firm* — Gray Ice Higdon

(57) ABSTRACT

Implementations relate to determining a rendering type for an application that is executing automatically. Based on user interactions with an application that is associated with specified input from the user while the user is interacting with the application, a confidence metric is generated for each specified input and a rendering type is determined based on the confidence metrics. Subsequently, when the user requests that a sequence of actions be performed, the application will be displayed according to the rendering type.

20 Claims, 13 Drawing Sheets

(56) References Cited

U.S. PATENT DOCUMENTS

| | | |
|---|---|---|
| 2018/0025291 A1* | 1/2018 | Dey .................... G06N 7/01 |
| | | 706/11 |
| 2018/0081884 A1* | 3/2018 | Tan .................... G06Q 30/0256 |
| 2018/0173403 A1* | 6/2018 | Carbune ............. G06F 3/04817 |
| 2019/0042627 A1 | 2/2019 | Osotio |
| 2020/0050467 A1* | 2/2020 | Dobson ................ G06V 30/416 |
| 2020/0233865 A1* | 7/2020 | Myers ................. G06F 16/9035 |
| 2022/0147227 A1 | 5/2022 | Carbune et al. |
| 2022/0405658 A1* | 12/2022 | Mitra .................... G06N 20/00 |
| 2023/0225290 A1* | 7/2023 | Lau ...................... A01K 29/005 |
| | | 119/720 |

OTHER PUBLICATIONS

European Patent Office; International Search Report and Written Opinion issued in Application No. PCT/US2024/040852; 16 pages; dated Nov. 14, 2024.

* cited by examiner

AUTOMATICALLY EXECUTING APPLICATION ROUTINES WITH USER INPUTS

BACKGROUND

A significant number of tasks that are performed by users on mobile devices are repetitive and may be performed multiple times a day and/or may be performed by multiple users in the same or a similar manner. In some instances, the sequence of steps that comprise an action may be difficult for a user to remember, may be time-consuming for the user to perform as needed, and/or may otherwise hinder a user from utilizing a mobile device to its fullest benefit.

For some actions, a user may not know the full capabilities of a mobile device and may therefore perform some actions less optimally than how the action(s) could otherwise be performed. Further, some actions may require a user to access multiple applications, perform multiple steps in a particular order, and/or provide repetitive input in order to complete an action. Thus, user input can be prone to errors that can inhibit performance of a desired action.

In some instances, a routine may be executed by an automated assistant and/or an operating system to automatically perform one or more actions in lieu of the user performing the actions. However, some routines may require a user to provide feedback and/or additional information in order for one or more of the actions to be performed. Thus, although the routine is primarily executing without user input, some actions may require the user to be prompted so that an action can be performed and the next action initiated.

SUMMARY

Techniques are described herein for determining, for an action that is executed by a system as part of an automated routine, a rendering for the application that is accessed during execution of the action. The technique includes identifying, based on previous, interactions of the user (or a plurality of users) with the application, specified input of the user when manually executing an action that is part of a routine. For example, if a user commonly performs an action, an automated suggestion can be provided to the user that includes rendering content in accordance with the prior inputs of the user.

In some instances, in order for an action to be performed, additional information from the user may be required. In that case, the user may be prompted for the information to utilize as a parameter to provide to an application that is part of the routine. For example, an action may be checking email, but the user has multiple email accounts. The user may be prompted as to which email account to access and be provided with the appropriate email. This may include providing the user with the interface for the requested email account (i.e., without displaying other interfaces that would otherwise be rendered if the user performed the action). If the user does not provide an email account preference, the system may access a default setting and continue with opening the email application and providing the user with the pertinent email interface.

As a result, when the system executes the action of opening an email application, the system may determine that the user usually opens a work email. The system may render an interface that allows the user to select which email account to open. This may be because the user has not performed that routine consistently over a period of time and sometimes opens a personal email but more often opens a work email on weekdays. Thus, the default setting may be the work email but the user is provided with an option to open a different email account. As the user selects work email a threshold number of times, the application may be rendered with the user not provided with a prompt to select the email account of preference, but may instead be directly provided the work email on weekdays. Similarly, if the user selects personal email on weekends, the user may be automatically provided the email interface without being prompted to select an email account.

In some implementations, when a user is provided with an option for execution of an application via an action, the system may wait a period of time before selecting a default option. For example, the user may select two different genres of music, but most commonly "classic rock." The user may be prompted to select "classic rock" for a period of time and, when the period of time expires, "classic rock" may be played. The application may be rendered to include a visual timer that can countdown the period of time to indicate to the user that "classic rock" will be played unless another option is provided by the user.

As another example, the user may listen to music each morning as part of a routine. When the user selects the music application (or is provided the music application during system execution of the action), the user may be prompted to enter a genre of music. If the user always (or a threshold number of times) selects "classic rock," the application may change the manner in which it is rendered such that the user is no longer provided with a prompt to select a genre. However, if the user commonly skips songs in a playlist, the music application may be rendered with a "next" button that allows the user to skip songs, but otherwise rendered in the background (i.e., without displaying the open music application interface).

In some instances, the user may be prompted with a notification that includes a "start" button that the user must select before the routine commences. The user may be required to confirm an action before the action occurs (e.g., waiting to call for a rideshare until the user indicates that he/she is ready to leave). For example, a user may always order a rideshare on weekdays via a rideshare application. However, the user leaves for work between 7 am and 7:30 am.

In some implementations, summary information may be provided to the user via an interface. This can include, for example, a notification that includes headlines from news stories without rendering an entire news application interface. Thus, while additional actions are being performed, the user can have an option to select a news story and read it in its entirety. When a news story is selected, the routine may be paused and/or continue executing if additional actions can occur in the background while the user reads the news article. For example, the user may select a news article to read, and if the next action is starting a playlist of songs, a music application may be prompted to start the playlist while the user is reading the article. As in previous examples, the rendering of content may be based on previous interactions of the user while listening to music and concurrently reading news.

In some implementations, a user may be provided with some information via an automated assistant. For example, the user may have a routine that includes checking the weather for the day, checking the news, and listening to a playlist of music. In some implementations, one or more of these actions can be rendered via an interface of a device. In some implementations, one or more of these actions can be rendered audibly, such as a summary of the weather and/or a listing of the day's headlines. As previously described, the user may pause an action, indicate an interest to stop an action and continue with the next action, cancel an action, be provided with a countdown etc.

Implementations of techniques described herein improve efficiency of a computing device by requiring fewer inputs from the user when automatically executing a routine. By not rendering some or all of the content of an application that is executing on a device, computing resources are conserved that would otherwise be required to execute an action. Furthermore, by reducing inputs required by the user to execute a routine, resources are reduced that would otherwise be required to process the input of the user.

Techniques described herein reduce memory and resource consumption of one or more computing resources by mitigating the need for a user to perform multiple actions to fulfill an intent that can otherwise be performed with fewer actions and/or automatically by one or more other components. For example, by suggesting a routine to a user to fulfill an intent, the suggested routine may include fewer steps and/or require fewer input parameters than would be required to manually perform the same routine. Further, by suggesting a routine for the user to utilize to fulfill an intent, the process is prone to fewer user input errors, thus reducing instances whereby a user initiates a series of actions, performs one or more of the actions out of sequence or incorrectly, and is required to re-perform one or more actions to fulfill a given intent.

The above description is provided as an overview of some implementations of the present disclosure. Further description of those implementations, and other implementations, are described in more detail below.

DETAILED DESCRIPTION

Figure 1:
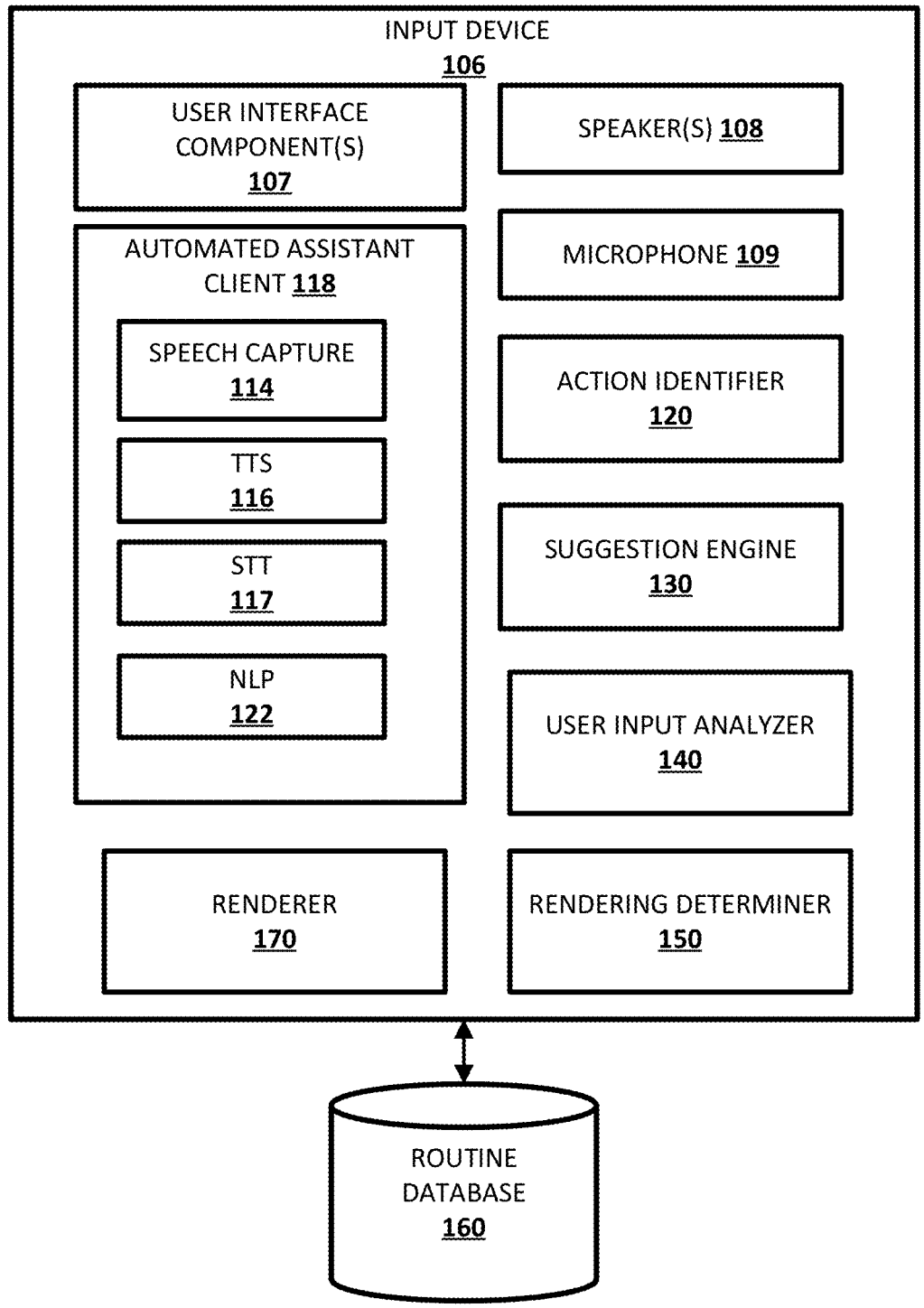
FIG. 1 is a block diagram of an example environment in which implementations disclosed herein can be implemented.

Turning now to FIG. 1, an example environment in which techniques disclosed herein can be implemented is illustrated. The example environment includes an input device 106 and a routine database 160. In some implementations, the routine database 160 may be a component of input device 106. In other implementations, the routine database 160 may be a separate component and the input device 106 can access the routine database 160 via one or more communication channels, such as via the Internet.

The input devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device), and/or any IoT device capable of receiving user input directed to the automated. Additional and/or alternative input devices may be provided. In some implementations, the plurality of input devices 106 can be associated with each other in various ways in order to facilitate performance of techniques described herein. For example, in some implementations, the plurality of input devices 106 may be associated with each other by virtue of being communicatively coupled via one or more networks. This may be the case, for instance, where the plurality of input devices 106 are deployed across a particular area or environment, such as a home, a building, and so forth. Additionally, or alternatively, in some implementations, the plurality of input devices 106 may be associated with each other by virtue of them being members of a coordinated ecosystem that are at least selectively accessible by one or more users (e.g., an individual, a family, employees of an organization, other predefined groups, etc.). In some of those implementations, the ecosystem of the plurality of input devices 106 can be manually and/or automatically associated with each other in a device topology representation of the ecosystem.

Each of the input devices 106 further includes respective user interface component(s) 107, which can each include one or more user interface input devices (e.g., microphone, touchscreen, keyboard, and/or other input devices) and/or one or more user interface output devices (e.g., display, speaker, projector, and/or other output devices). As one example, user interface components 107 of input device 106 can include only speaker(s) 108 and microphone(s) 109, whereas user interface components 107 of another input device 106 can include speaker(s) 108, a touchscreen, and microphone(s) 109.

In various implementations, each of the input devices 106 may operate a respective automated assistant client 118. In various embodiments, each automated assistant client 118 may include a respective speech capture/text-to-speech (TTS)/speech-to-text (STT) module 114 (also referred to herein simply as "speech capture/TTS/STT module 114"). In other implementations, one or more aspects of the respective speech capture/TTS/STT module 114 may be implemented separately from the respective automated assistant client 118.

Each respective speech capture/TTS/STT module 114 may be configured to perform one or more functions including, for example: capture a user's speech (speech capture, e.g., via respective microphone(s) 109); convert that captured audio to text and/or to other representations or embeddings (STT) using speech recognition model(s) stored in a database; and/or convert text to speech (TTS) using speech synthesis model(s) stored in a database. Instance(s) of these model(s) may be stored locally at each of the respective input devices 106 and/or accessible by the input devices. In some implementations, because one or more of the input devices 106 may be relatively constrained in terms of computing resources (e.g., processor cycles, memory, battery, etc.), the respective speech capture/TTS/STT module 114 that is local to each of the input devices 106 may be configured to convert a finite number of different spoken phrases to text (or to other forms, such as lower dimensionality embeddings) using the speech recognition model(s).

Other speech input may be sent to one or more of the cloud-based automated assistant components, which may include a cloud-based TTS module and/or a cloud-based STT module.

The NLP module 122 processes natural language input generated by users via the input devices 106 and may generate annotated output for use by one or more other components of the automated assistant, the input devices 106. For example, the NLP module 122 may process natural language free-form input that is generated by a user via one or more respective user interface input devices of the input devices 106. The annotated output generated based on processing the natural language free-form input may include one or more annotations of the natural language input and optionally one or more (e.g., all) of the terms of the natural language input.

In some implementations, the NLP module 122 is configured to identify and annotate various types of grammatical information in natural language input. For example, the NLP module 122 may include a part of speech tagger configured to annotate terms with their grammatical roles. In some implementations, the NLP module 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the NLP module 122 may rely on annotations from one or more other components of the NLP module 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 122 may use related data outside of the particular natural language input to determine one or more annotations—such as an input device notification rendered immediately prior to receiving the natural language input on which the input device notification is based.

input device 106 further includes an action identifier 120 that can determine that a user has performed one or more actions. In some implementations, action identifier 120 can monitor the user interface components 107 to determine when the interface has been updated. For example, action identifier 120 can determine that a graphical user interface has changed and, in response, capture an image of the interface. Thus, in some implementations, action identifier 120 can periodically capture screenshots of a graphical interface and provide the screenshots to one or more other components, such as image analysis engine 130, for further analysis and/or processing.

In some implementations, action identifier 120 can identify instances of the user interacting with one or more interfaces of input device 106. For example, action identifier 120 can periodically determine whether the interface of input device 106 has been updated and, in instances whereby the interface has changed in some manner, capture a screenshot of the interface. Also, for example, an application can provide action identifier 120 with an indication that the user is interacting with the application and, in response, action identifier 120 can capture a screenshot and/or request one or more other components to provide additional information regarding the action(s) performed by the user.

Figure 2A:
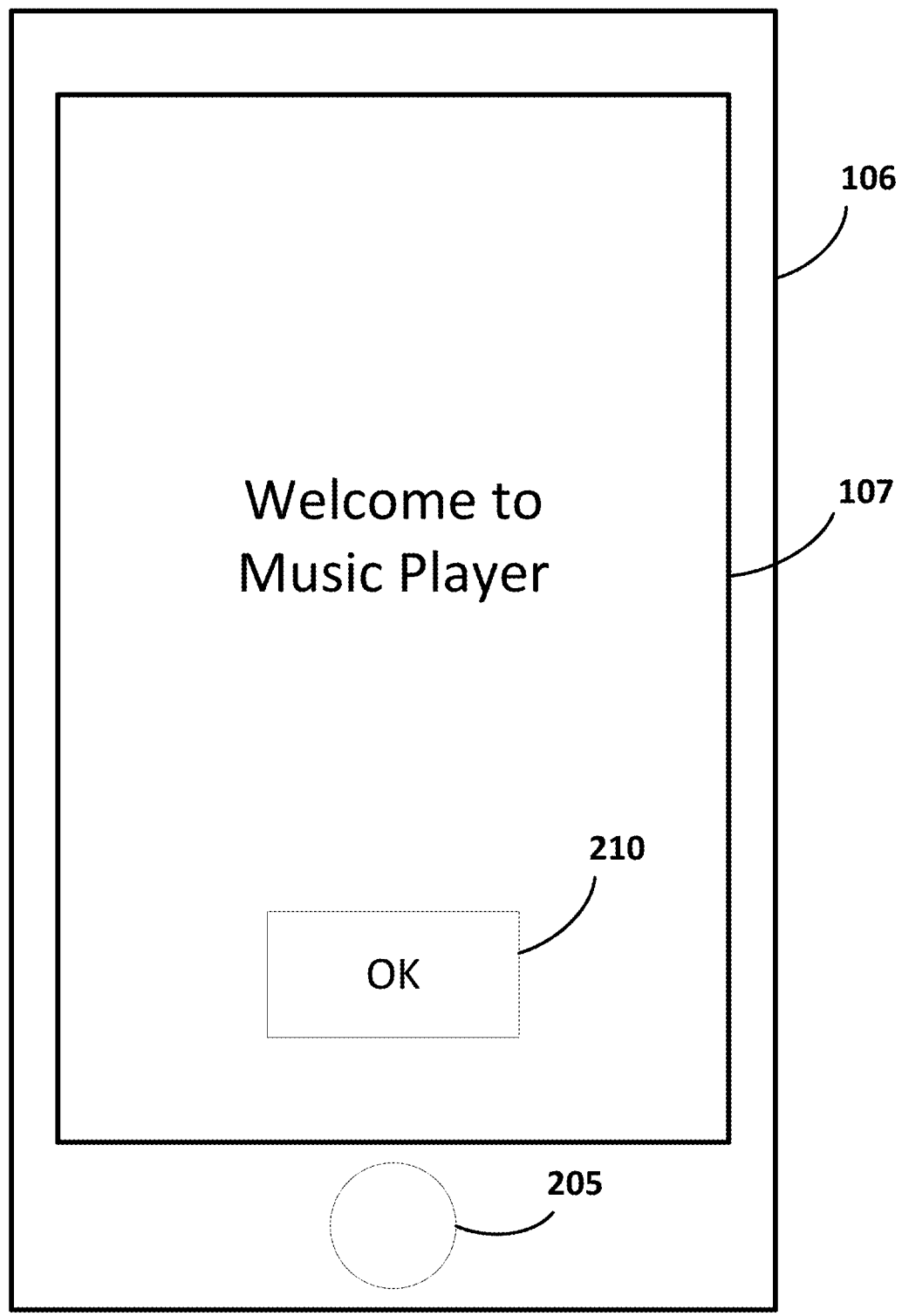
FIG. 2A, FIG. 2B, FIG. 2C, and FIG. 2D depict example interfaces illustrated via a user interface of a user device.

As an example, a user may be interacting with a media playback application that is executing on input device 106. Referring to FIG. 2A, input device 106 is illustrated with interface 107 displaying a graphical user interface of the media playback application. The interface 107 includes a button 210 that the user can interact with by touching the interface 107. The input device 106 further includes a physical button 205 that the user can press to cause one or more actions to occur. For example, the user can select the physical button 205 to cause the interface 107 to display a home screen and/or to cause the input device 106 to enter a standby mode.

When the user selects the button 210, the interface 107 updates to display an additional graphical interface of the media playback application. When the user selects the button 210, the application can provide action identifier 120 with an indication that the user has selected a location of the interface 107 and further indicate coordinates where the user selected the interface 107. Further, action identifier 120 can capture a screenshot of the interface 107. Based on identifying the location where the user selected the interface and a screenshot of the interface, one or more components, such as image analysis engine 130, can determine an action that was performed by the user, as further described herein.

Figure 2B:
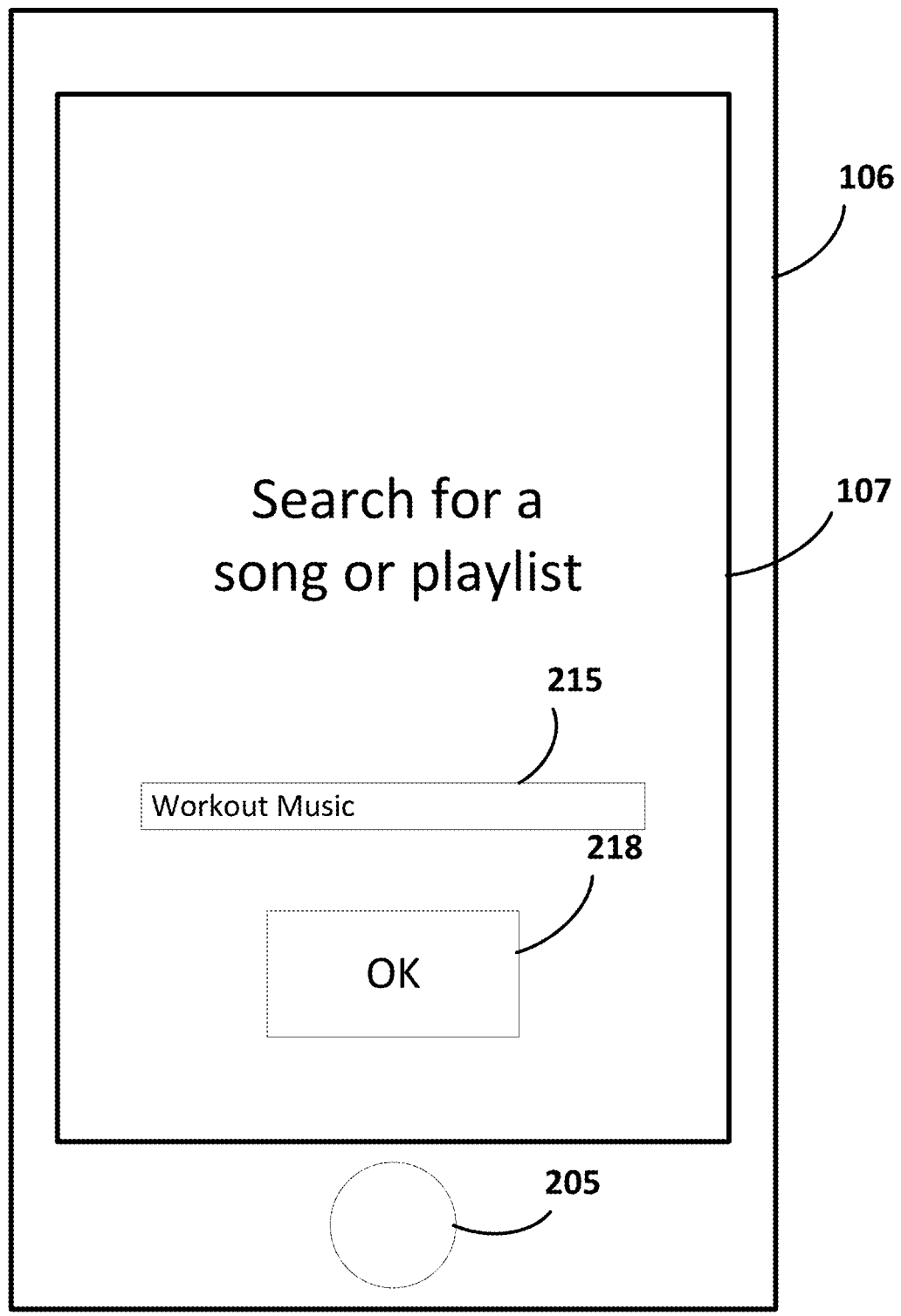

The graphical user interface illustrated in FIG. 2B includes a text box 215 to allow a user to enter textual information that can be utilized to identify a song and/or playlist that the user has interest in having played via the application. As illustrated, the user has entered "Workout Music" which may be a name of a song and/or a playlist that is accessible via the application. Once the user has entered the text into text box 215, the user can select the button 218 to cause the application to process the text that was entered into text box 215.

For each of the actions that were performed by the user, action identifier 120 may capture one or more screenshots and/or a recording of screenshots in a sequential order (i.e., a screen recording that captures multiple frames of user interactions). For example, when the user enters textual information into the text box 215, action identifier 120 can capture one or more screenshots of the user activity. Also, for example, when the user selects the button 218, the application (or another application executing on mobile device 106) can provide the action identifier 120 with an indication that the user has selected a button and action identifier 120 can capture one or more screenshots, identify locations on the interface where the user has interacted, and/or determine, based on additional information from the application, that the user has performed an action.

Figure 2C:
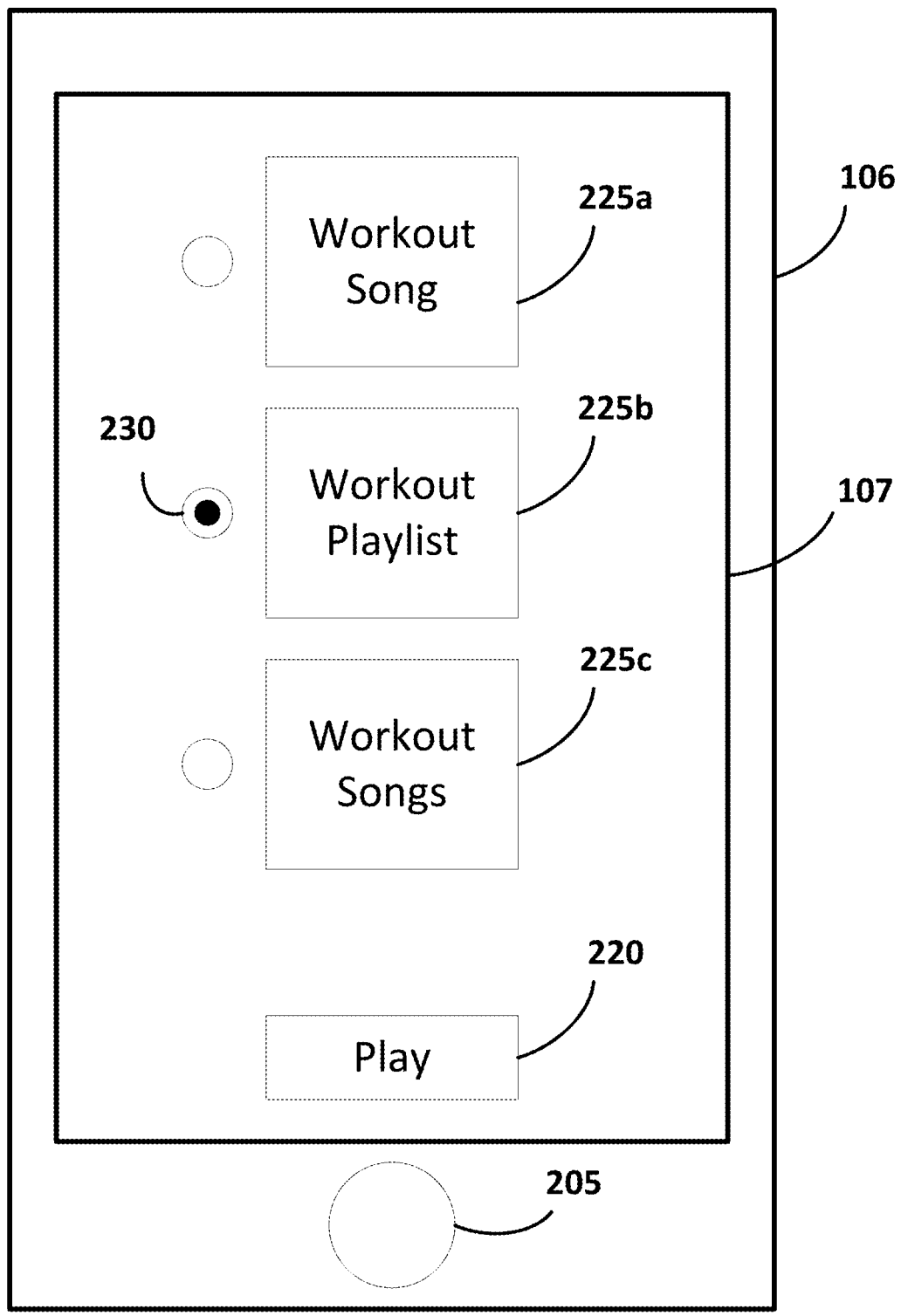

Referring to FIG. 2C, another graphical interface is illustrated that can be rendered via interface 107 by a media playback application. The graphical interface illustrates three possible selections that may fulfill the user request (as provided by the user via the text box of the interface illustrated in FIG. 2B). As illustrated, the possible selections include "Morning Song" 225a, "Workout playlist" 225b, and "Good Morning Songs" 225c. Each of the selections is further provided with a radio button, of which button 230 is selected. The user can interact with the interface 107 to select which of the selections (225a, 225b, and/or 225c) the user has interest in being played via the application. Once the user selects the correct selection, the button 220 can be selected to indicate a selection has been made.

As with previous interfaces, action identifier 120 can capture screenshots of the interface 107. For example, when the user interacts with button 220, a screenshot of the interface can be captured by action identifier 120. Also, for example, screenshots can be captured by action identifier 120 on a periodic basis and further utilized by image analysis engine 130 to determine one or more actions performed by the user while the user was interacting with the application. Further, user interface interaction data (e.g., indications of the user selecting a location of the interface, coordinates of the interface where the user selected) can be provided to action identifier 120 with screenshots which can be utilized by image analysis engine 130 to determine one or more actions that were performed by the user.

Figure 2D:
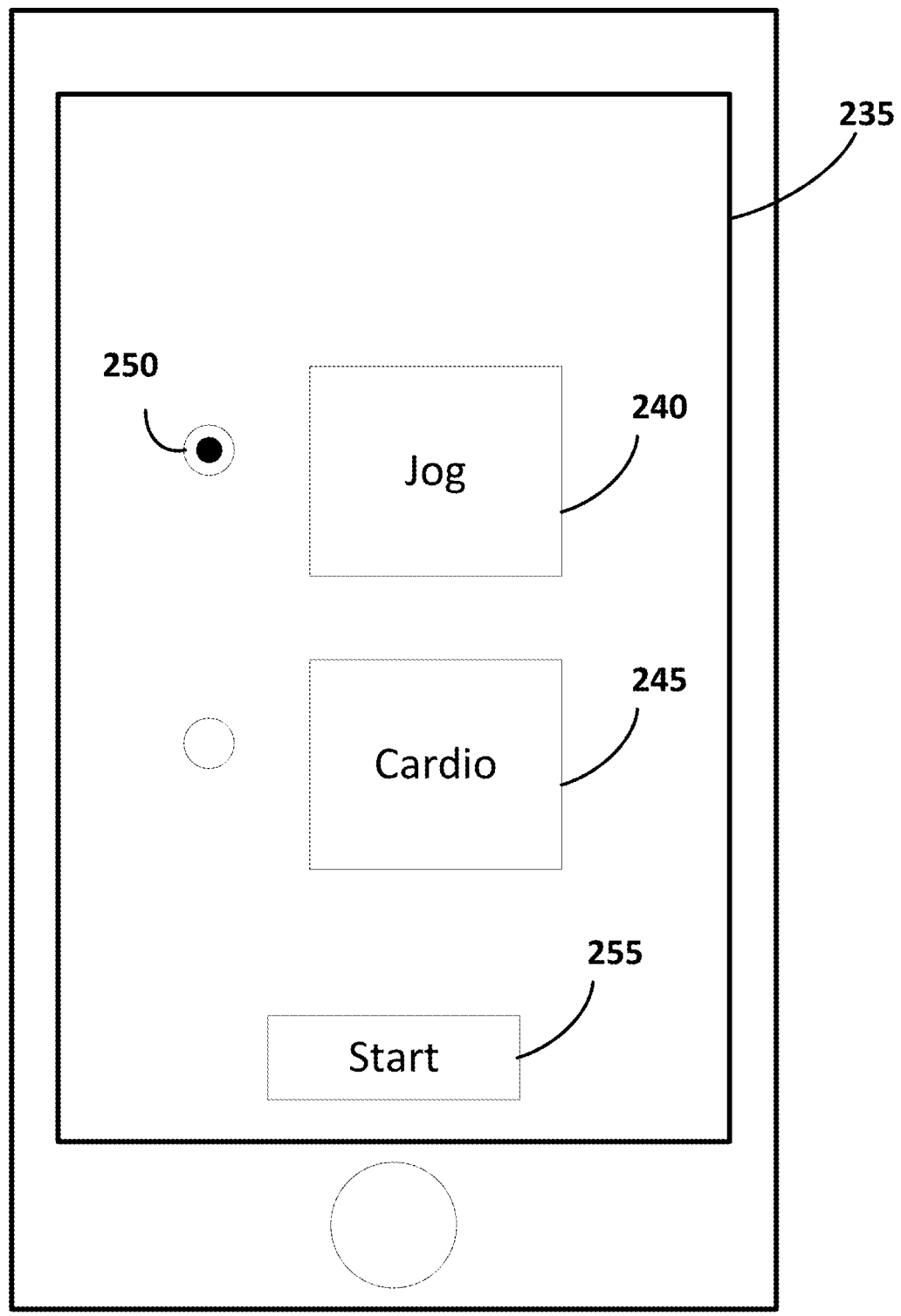

Referring to FIG. 2D, another example of a user interacting with an application is illustrated. In this instance, the user is interacting with a workout application and is provided with multiple workouts that the user can initiate. For example, the interface illustrates a "jog" workout 240 and a "cardio" workout 245. Through one or more interactions with the interface 235, the user has selected radio button 250 to initiate a "jog" workout. The user can then select start button 255 to start the workout routine (e.g., while the selected music playlist is being played).

In some implementations, once it is determined that a user has completed a routine, the routine can be stored as a candidate user-generated routine. For example, the user may select a particular playlist and then start a workout routine. Also, for example, the user can use a ride sharing application to order a ride and then check emails via an email application. In some implementations, once a user has performed a series of actions a threshold number of times, the routine can be stored as a candidate template routine that can subsequently be provided to the user as a routine suggestion.

In some implementations, one or more trigger criteria can be associated with a routine. For example, if the user orders a ride via a ride sharing application and checks emails every weekday morning at 8 am, the routine can be tagged with that information as a trigger criteria. The trigger criteria can then be utilized to determine when a routine suggestion is provided to the user, as described herein.

Once one or more actions are determined, template suggestion engine 130 can select a template routine to provide as a suggestion. Template suggestion engine 130 can compare the one or more actions that were identified to one or more templates, each of which can include one or more template actions. For example, a template routine for "navigating to <location>" can include the actions of "open mapping application," "enter <location> in text box," and "select 'start directions' button" as actions. The user actions that were identified can include "open mapping application," "enter 'home' in text box," and "select 'start directions' button" as identified user actions. The template routine for "navigating to <location>" can be selected as a suggestion to provide to the user based similarity between the template actions and the identified actions of the user.

In some implementations, a template routine can be selected that includes one or more parameters as input. Referring again to the previous example, the "navigating to <location>" template routine requires a "location" parameter. Because one of the actions of the user included providing input (i.e., a "location"), the template suggestion engine 130 can select the "navigating to <location>" template routine based at least in part on the user providing input that matches the required parameter for the template routine.

User input analyzer 140 determines, based on an action that was performed by a user as part of routine, the specified inputs of the user for the action. In some instances, the user may provide varying input for an action, and user input analyzer 140 determines which actions include the multiple inputs of the user over a number of executions of the routine. Once multiple inputs are determined, user input analyzer 140 generates a confidence metric for each of the inputs based on a number of occurrences of each of the various inputs.

As an example, referring again to FIG. 2B, the user has entered, as input, "workout music" into text box 215. However, the user may enter any text into the text box to indicate a specific playlist or song. Thus, for the instance whereby the user performs a "workout routine," the specified input is "workout music." User input analyzer can determine that "workout routine" is a specified input and associate the input with the routine. Once a routine has been selected as a suggested routine of the user (i.e., the template routine that is suggested to the user as a suggested routine), any specified user inputs can be utilized to determine how to render the application when the routine is automatically executed by the system, as further described herein.

Figure 3A:
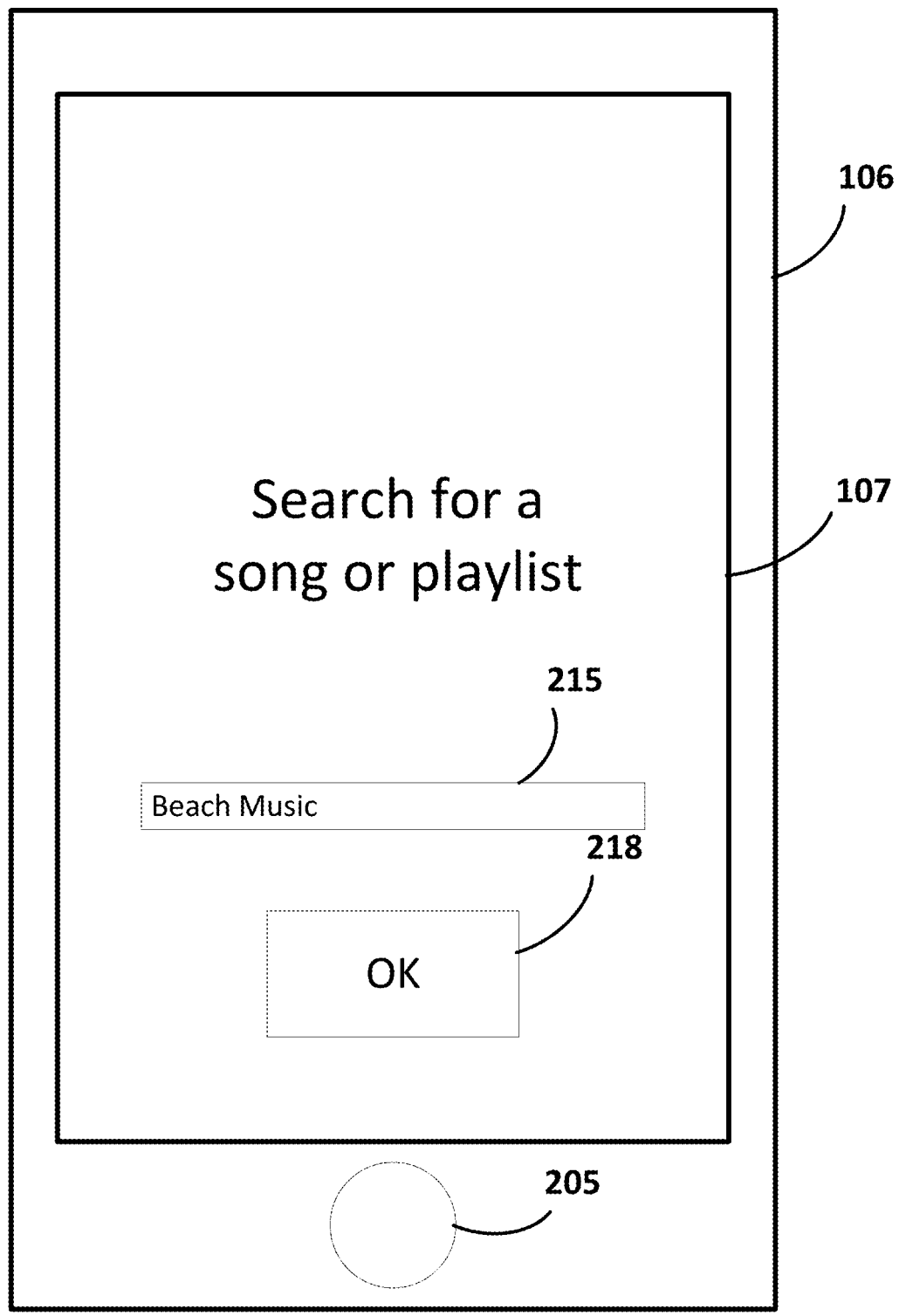
FIG. 3A, FIG. 3B, and FIG. 3C depict example interfaces illustrated via a user interface of a user device.

Continuing with the prior example, referring to FIG. 3A, another interface is illustrated that is the same interface as FIG. 2B. In this instance, the user has entered "Beach Music" into text box 215. User input analyzer 140 can identify a different specified user input for this instance of the user executing a routine, and further track the count of number of occurrences of the user input. If, for example, the user entered "workout music" nine times and "Beach Music" once, user input analyzer 140 can store the inputs with the user-executed routine for later utilization if the user selects the suggested routine by suggestion engine 130. The inputs can be stored as number of occurrences, as a percentage of occurrences (e.g. 90% for "workout music" and 10% for "beach music"), and/or other metric that indicates the occurrences of the inputs relative to one another.

Figure 4A:
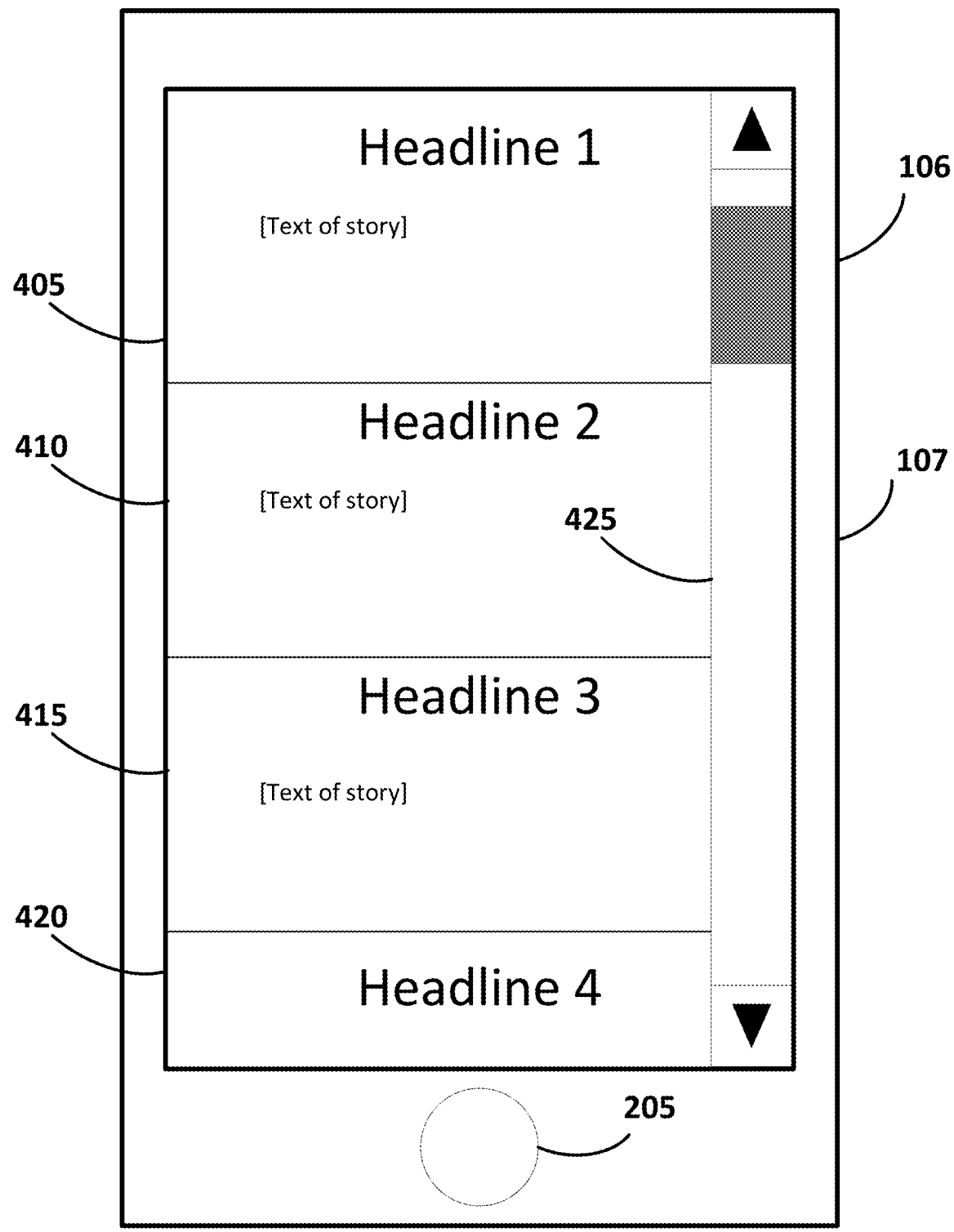
FIG. 4A and FIG. 4B depict example interfaces illustrated via a user interface of a user device.

As another example, referring to FIG. 4A, an interface of a news application is illustrated. The news application includes news stories 405, 410, 415, and 420, each of which includes the text (or a portion of the text) from a news article. In some implementations, the user can select a news story and/or the headline of a news story and be provided with additional information related to what is provided via the interface (e.g., the rest of an article). Further, the interface 107 illustrates a scroll bar 425 that, when interacted with by the user, allows the user to scroll to additional content. The user may, in some instances, review news articles for a short period of time, such as two minutes. At other times, the user may review articles for a longer period of time, such as when the user selects one or more of the articles to read in depth. Thus, for an action of providing news to the user, an indefinite period of time may elapse between reading news and the next event in a routine.

Referring again to FIG. 1, rendering determiner 150 can determine, based on metrics generated by user input analyzer 140, a rendering type to render an application that is accessed based on an action of a routine. For example, action identifier 120 can identify actions of the user, suggestion engine 130 can suggest a routine to the user after the user has performed an action a threshold number of times, and user input analyzer 140 has determined one or more specified inputs of the user during those user performances. Once a rendering type has been suggested and inputs from the user analyzed, rendering determiner 150 can determine a rendering type and store the rendering type with the corresponding action in routine database 160 as part of a routine (i.e., a sequence of actions).

Rendering types can vary based on inputs from the user and/or types of information that is provided to the user when the user performs an action without utilizing a routine suggestion. For example, for an action that includes the user providing free form input, such as providing a textual representation to initiate a search, the user may be provided with previously provided inputs to allow the user to efficiently select an option from the provided inputs. Also, for example, a summary of information from an application may be provided to the user to more efficiently select the content that the user has interest in being provided.

In some implementations, an application may be rendered with an interface that allows the user to select an input from among previously received inputs that the user provided while performing an action manually. For example, if a user has requested rides to a "work" location and a "home" location, the user may be provided with an interface that allows for selecting one of those options (and/or selecting a different option) without being provided with an application interface that provides only for entry of a destination via text. Thus, by providing a different interface, the user can select from among most common destinations without entering the address. Also, for example, the user may be provided with the same interface that the application typically renders, but with a text box pre-filled with the destination of the most common address.

Figure 3B:
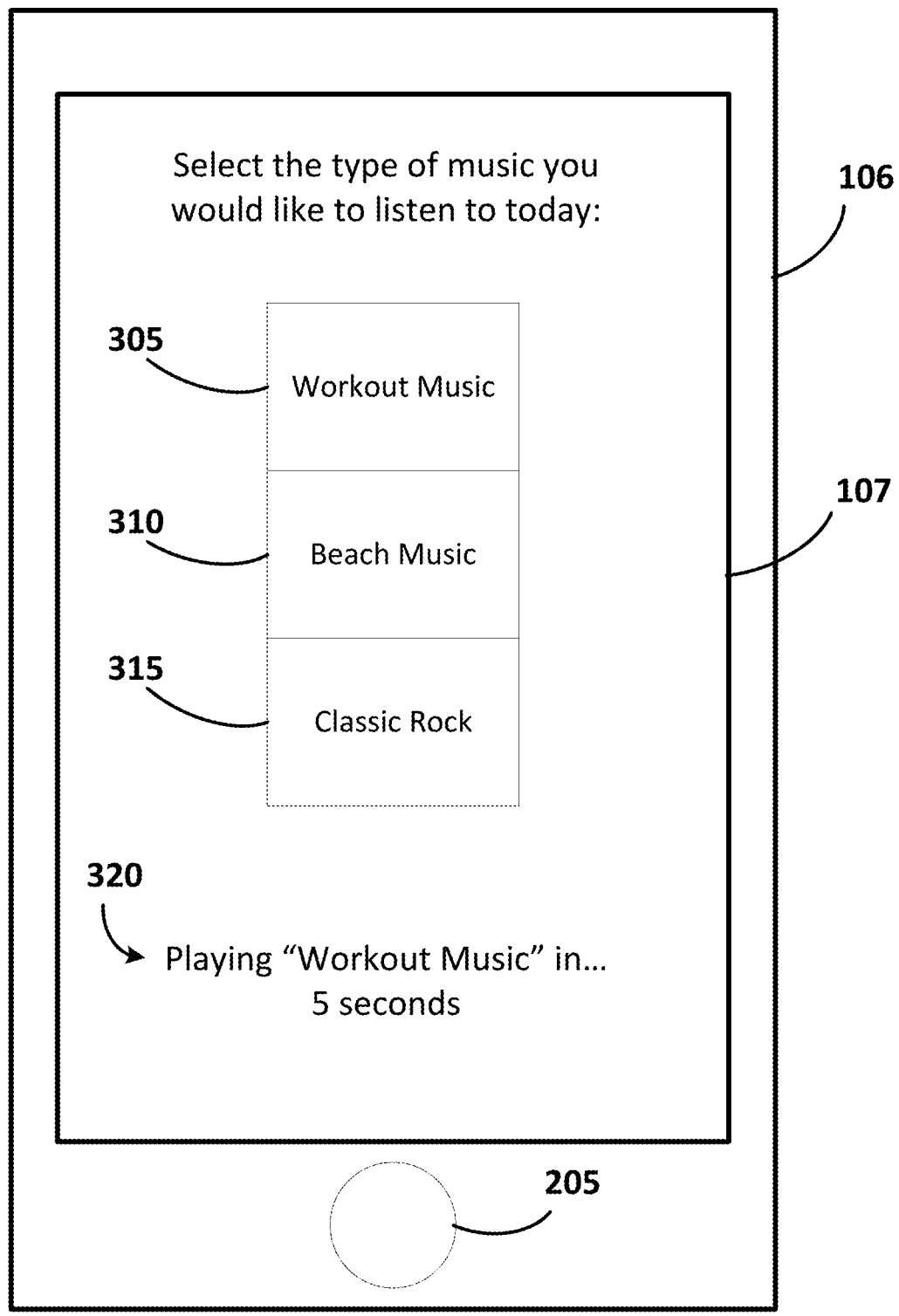

For example, referring to FIG. 3B, an interface is provided that can be provided to the user in lieu of providing the interface illustrated in FIG. 3A. The interface includes a button 305, labeled "Workout Music," a button 310 labeled "Beach Music," and a button 315 labeled "Classic Rock." When the user selects one of the buttons 305, 310, and/or 315, the corresponding playlist may start to be rendered. For example, if the user selects button 305, a "workout music" playlist may start. This is similar to the result of the user typing "workout music" into the application interface, as illustrated in FIG. 3A. Also, for example, if the user selects button 310, the renderer 170 can render the interface of FIG. 3A, with text box 215 pre-filled with the most common input from the user.

In some implementations, the user may be provided with a plurality of options and further, if the user does not select an option, the application may be rendered with the most common input (and/or a value pre-set by the user). For example, referring to FIG. 3B, a countdown message 320 is included as a part of the interface. The countdown message is illustrated as indicating that there are five seconds left until a selection will be made for the user (i.e., "workout music"). The countdown timer may further indicate "4," "3", "2," "1," and then start the "workout music" playlist. The next action in the routine can then be initiated.

In some implementations, an application may be rendered in the background and/or with only an indication that the application is executing. For example, in some instances, an application may not require additional input from the user to execute the actions of the routine. Also, in some implementations, a most common input that is determined based on previous inputs of the user, may be utilized as an input and the application can be executed without rendering an interface.

Figure 3C:
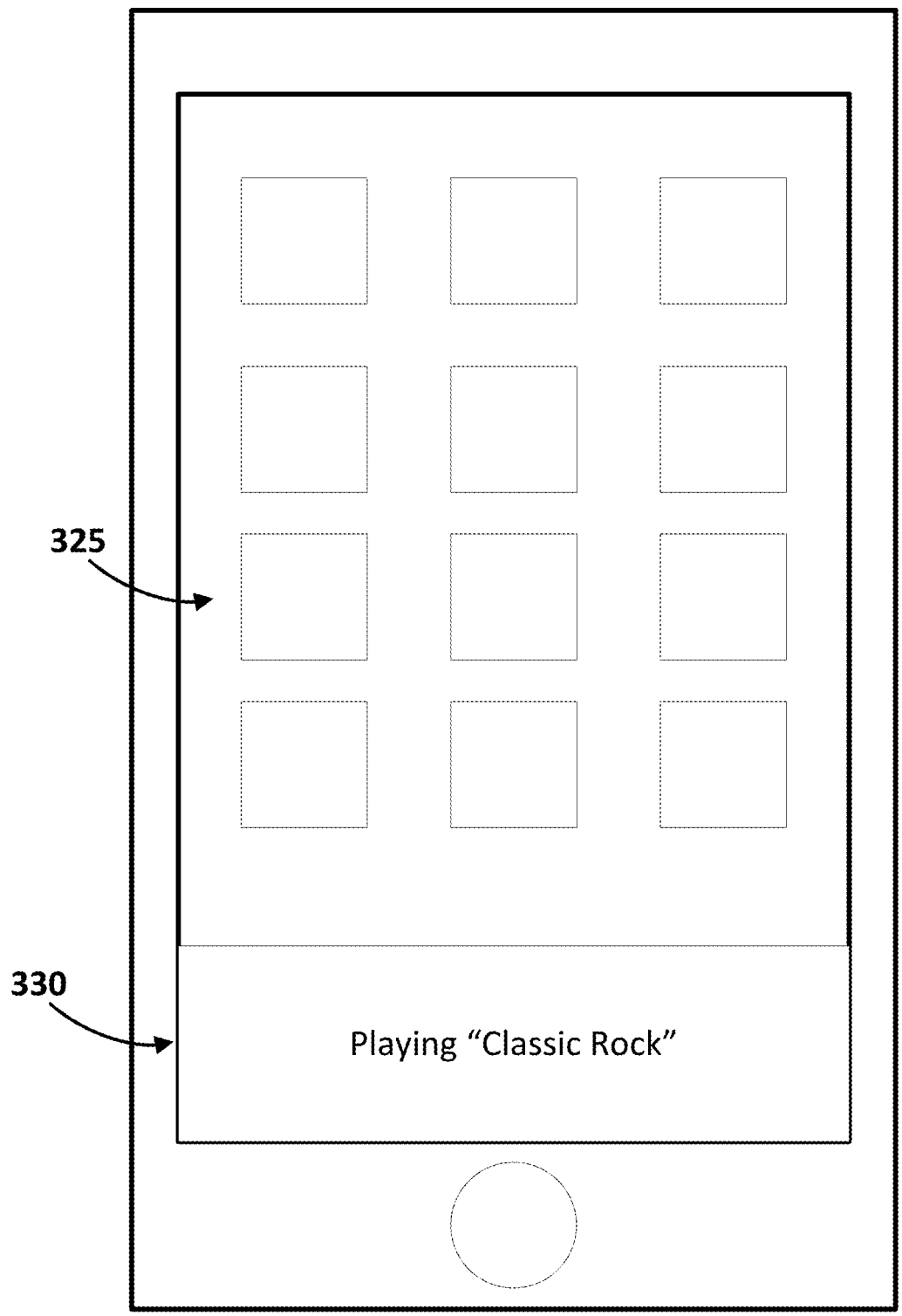

For example, referring to FIG. 3C, a home screen 325 is illustrated with a notification 330. The home screen may be the typical interface that is provided to the user upon unlocking the mobile device 106 when another application is not executing. In some implementations, an application can be rendered in the background such that no part of the interface is visible. By performing an action in the background, the user can be provided with content (e.g., audio content) and/or one or more actions that does not require any visual rendering (e.g., controlling a smart light) can occur without the interface displaying the application.

As illustrated, the only indication that an application is executing in the background is the notification 330. The notification indicates that a "Classic Rock" playlist is being rendered audibly by the application as an action that is part of a routine. As illustrated, the home screen 325 is visible in the remainder of the interface 107. However, in some implementations, one or more other applications may be visible via the interface. For example, the next action in a routine may include rendering an interface to the user. The interface may be rendered while the notification 330 is visible to indicate an action that is occurring audibly while another action has been initiated.

In some implementations, notification 330 can be rendered with one or more buttons to allow the user to control the content being rendered in the background, to change an input for the application executing in the background, and/or to affect the action that is currently being performed. For example, notification 330 can be rendered with a button to change the song currently being played (e.g., a "next" button and/or a "back" button), a button to stop the rendering (e.g., a "pause" button), a button to change an input (e.g., a "change playlist" button), and/or an interactive element that can affect the behavior of the current action (or one or more previous actions and/or one or more subsequent actions).

Figure 4B:
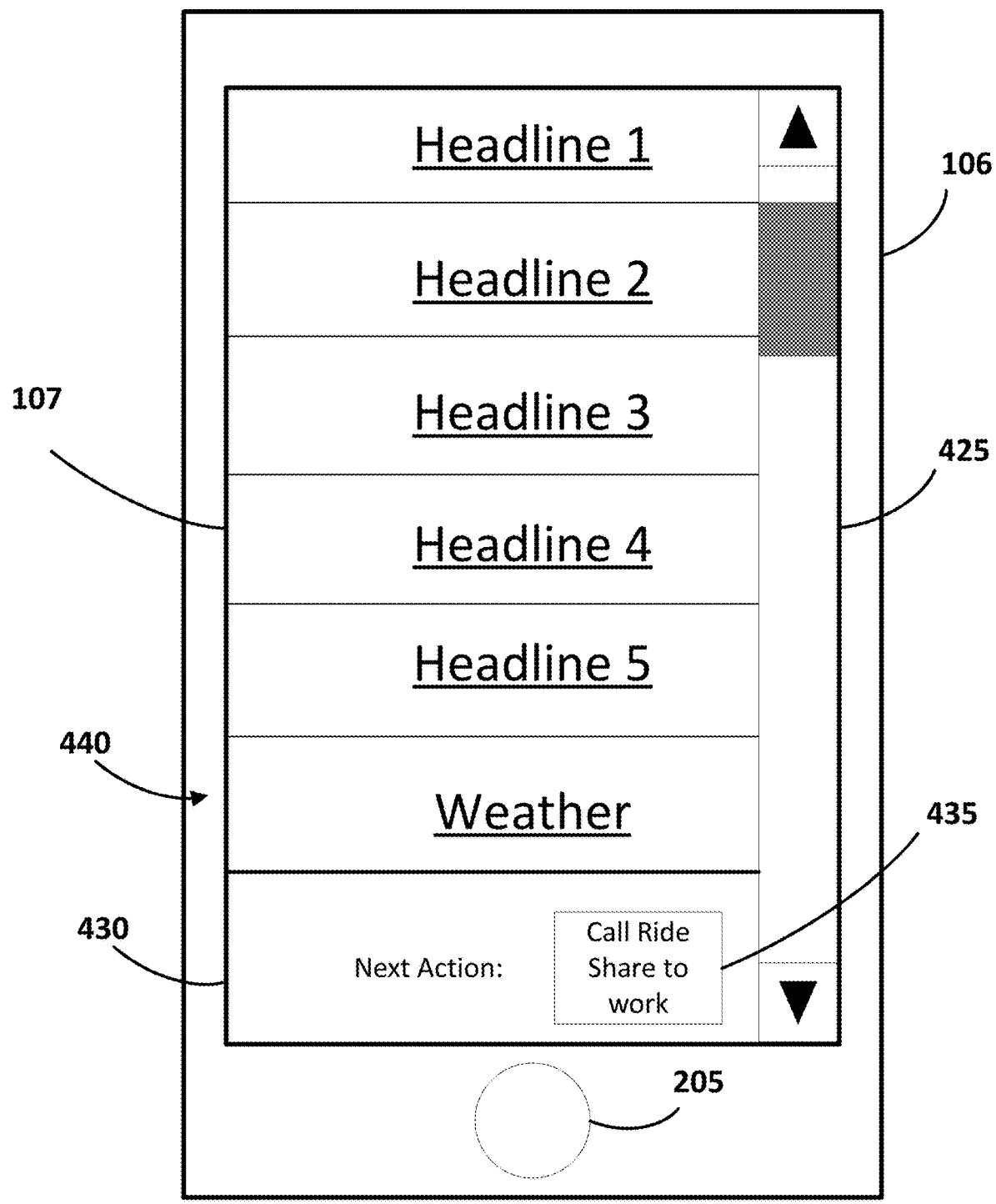

As another example, referring to FIG. 4B, an interface is illustrated that renders summaries of an application interface. The interface includes a notification 430 that indicates the user can continue to the next action when he/she is finished with the current action. In this case, the interface illustrates a series of news article headlines that the user can review. Because the time that the user views the news can vary and/or because the exact time that the user typically continues to the next action (in this case, calling a ride share), the notification 435 is provided with a button 435 that, when the user selects, can initiate the next action. In some implementations, once the user selects to initiate the next action, the interface may continue to display the news and/or proceed to the next rendered interface. In some of those instances, the user may be provided with an option to go back to the news while waiting for the ride share to arrive.

In some implementations, a rendering type for an application can include summarizing information that would otherwise be provided in its entirety. For example, referring again to FIG. 4A, news articles 405, 410, 415, and 420 are provided with additional content for each of the articles. The headlines for the news articles may be rendered to the user without the additional content. For example, referring to FIG. 4B, the headlines are provided without providing the additional content. Also, for example, a link 440 is provided to a weather page. The link 440 may be provided based on past user interactions whereby the user has visited a weather page and/or commonly views the weather when viewing new articles. Further, as illustrated, the rendered interface includes a scroll bar 425, which may be a feature of the rendering type for the interface.

In some implementations, rendering determiner 150 may determine a rendering type based at least in part on the content of an interface of the application. For example, referring to FIGS. 4A and 4B, rendering determiner 150 may determine that, for news applications, a summary rendering type is appropriate for displaying the type of information included in FIG. 4A. Thus, both previous user interactions and application information can be utilized to determine a rendering type.

Figure 5:
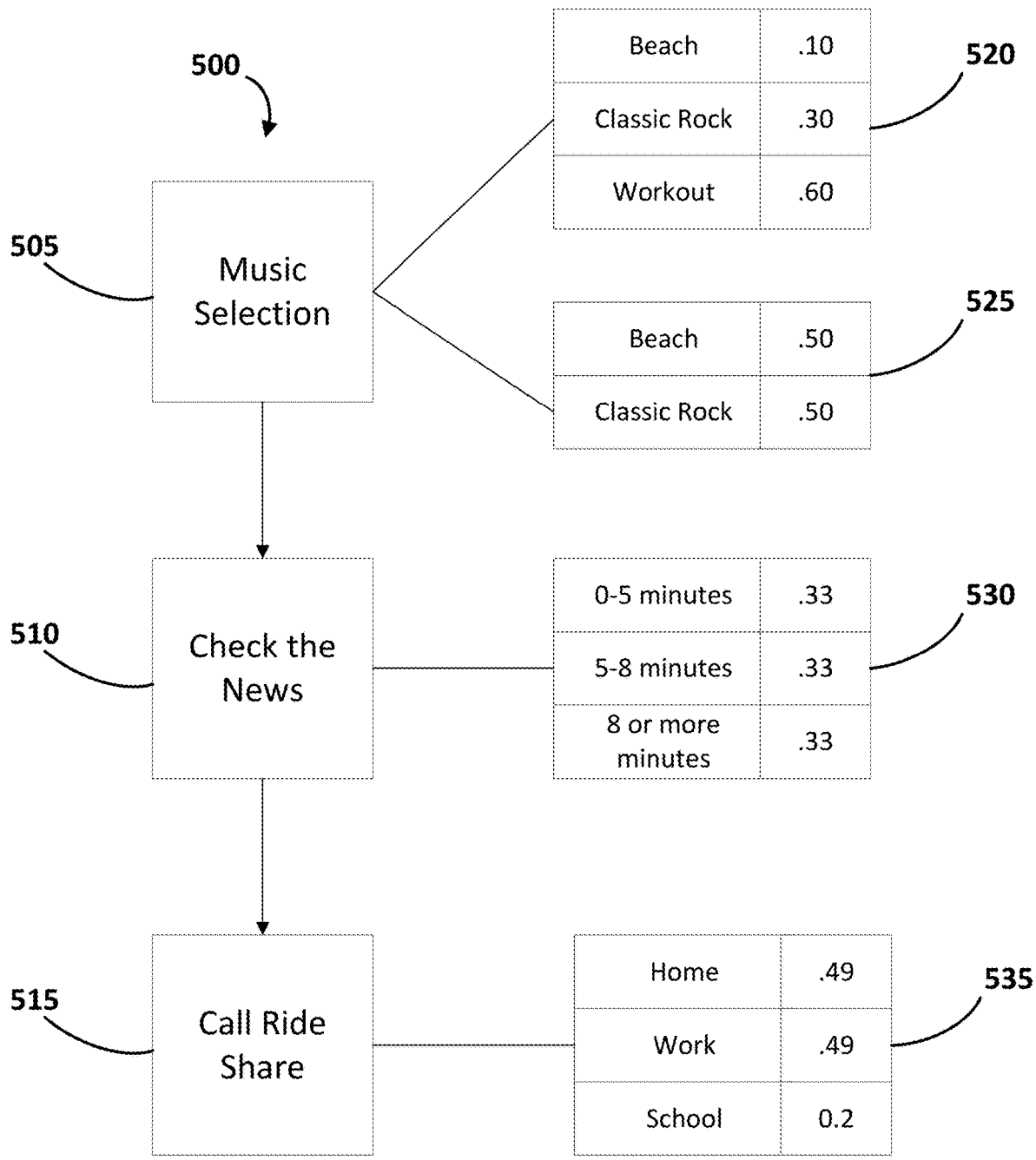
FIG. 5 illustrates a sequence of user actions and corresponding confidence metrics.

In some implementations, the number of each of a plurality of specified inputs that a user provides in previous interactions can be utilized to determine one or more aspects of a rendered interface. For each of the specified inputs, a confidence metric can be generated that indicates the number (or percentage of interactions) each input was provided by the user. For example, referring to FIG. 5, a routine 500 is illustrated that includes three actions. First, a user is provided with a music selection 505. Next, the user is provided with news via a news application. Finally, a rideshare is called for the user 515.

For the action of music selection 505, two sets of specified inputs of the user are illustrated. The first set 520 can be for user interactions that occurred on a weekday. For example, in 10% of user interactions, the user may have provided "beach" music. Further, for 30% of the user interactions on weekdays, the user may have provided "classic rock" as input. Still further, the user may have provided "workout" as input on weekdays.

Based on those confidence metrics, rendering determiner 150 may determine a rendering type for the music application. If a confidence metric satisfies a threshold, the music application may be rendered in the background without prompting the user for input. For example, if a threshold is 0.50, the application may be rendered as illustrated in FIG. 3C. However, if a threshold is 0.65, the music application may be rendered as illustrated in FIG. 3B, with the additional user-specified inputs of "classic rock" and "beach." In this instance, if the user does not select a playlist, the application may start a "workout routine" based on that input having the highest confidence metric.

Figure 6:
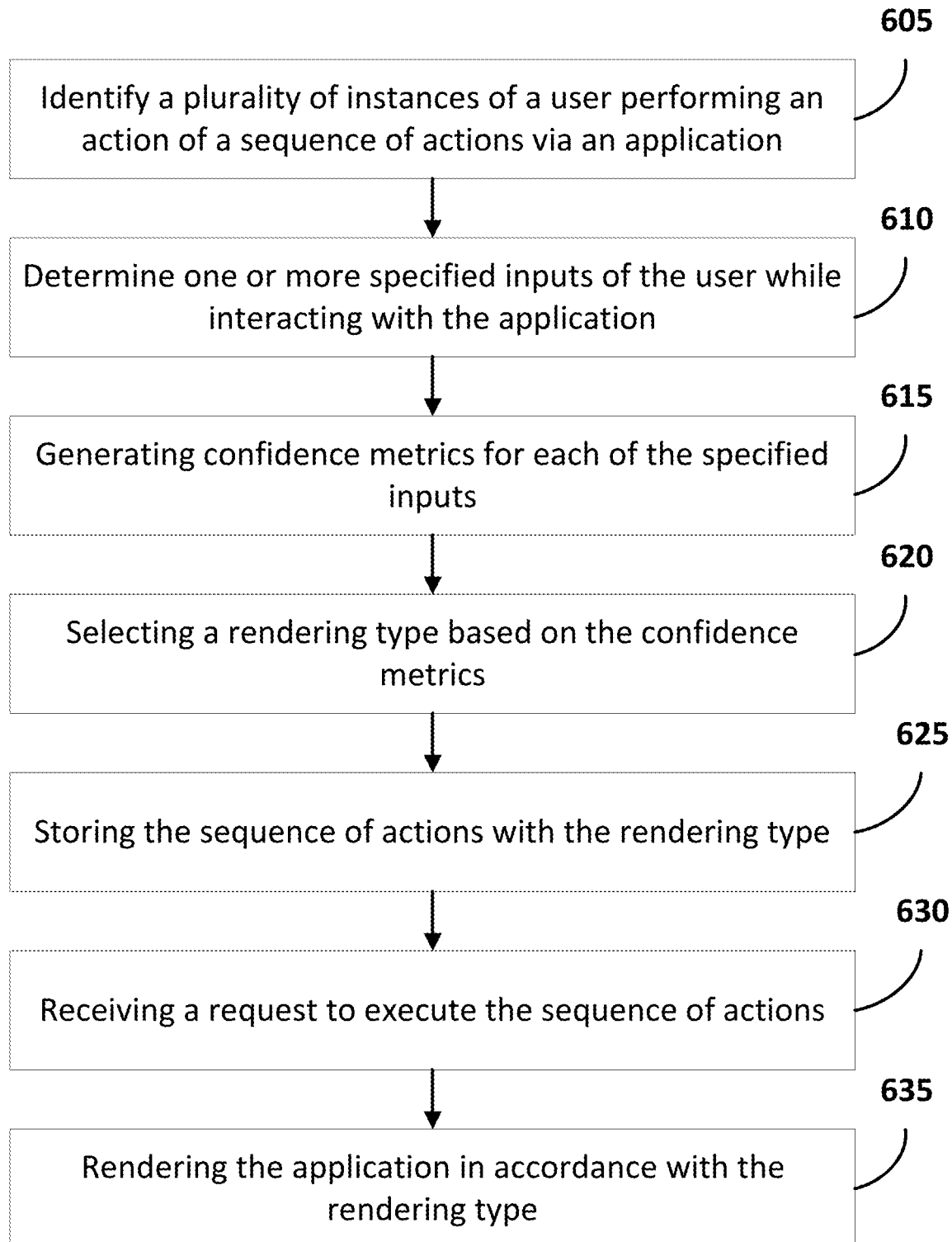
FIG. 6 depicts a flowchart illustrating an example method according to various implementations disclosed herein.

FIG. 6 depicts a flowchart illustrating an example method of determining a rendering type for an application based on previous specified input of a user. For convenience, the operations of the method are described with reference to a system that performs the operations, such as the system illustrated in FIG. 1. This system of the method includes one or more processors and/or other component(s) of a client device. Moreover, while operations of the method are shown in a particular order, this is not meant to be limiting. One or more operations may be reordered, omitted, or added.

At step 605, a plurality of instances of a user performing an action that is part of a sequence of actions are identified. The sequence of actions can be identified when the user performs a series of steps, in a particular order, and performs the steps in a threshold time and/or finishes the actions with a terminating action. For example, a user may open a mobile device, access one or more applications, and then lock the mobile device. In some implementations, the sequence of actions can be identified based on the user performing the same (or similar) actions multiple times. For example, an action may be identified that is part of a sequence of actions after the user has performed the series of actions five times. Also, for example, the system may suggest a routine to a user and the sequence of actions can be the actions that are included in the routine.

At step 610, one or more user specified inputs while interacting with the application are determined. The one or more specified inputs of the user can be inputs that the user provided to an application that is associated with one or more of the actions of the user while performing a routine. For example, a user may access a music application and provide a playlist name, which can be a specified input of the user.

At step 615, confidence metrics for each of the specified inputs are generated. Each of the confidence metrics can be determined based on a number of occurrences of each of the various specified inputs. For example, a first confidence metric can be determined for a first specified input based on the number of times the user interacted with the corresponding application and provided the first specified input. A second confidence metric can be determined for a second specified input based on the number of times the user interacted with the corresponding application and provided the second specified input. If the user entered the first specified input more times than the second specified input, the confidence metric for the first specified input would be more indicative in confidence that the user would prefer the first specified over the second specified input.

At step 620, a rendering type is selected based on the confidence metrics. Rendering types can vary based on inputs from the user and/or types of information that is provided to the user when the user performs an action without utilizing a routine suggestion. For example, for an action that includes the user providing free form input, such as providing a textual representation to initiate a search, the user may be provided with previously provided inputs to allow the user to efficiently select an option from the provided inputs. Also, for example, a summary of information from an application may be provided to the user to more efficiently select the content that the user has interest in being provided. In some implementations, a rendering type can include an interface that allows the user to select an input from among previously received inputs that the user provided while performing an action manually. Also, for example, the user may be provided with the same interface that the application typically renders, but with a text box pre-filled with one of the specified inputs. At step 625, the sequence of actions are stored with the rendering type.

At step 630, a request is received to execute the sequence of actions. The request can originate from one or more systems that determine that the user has interest in one or more sequences of actions based on a trigger event. A trigger event can include a particular time of day, a state of the mobile device that is executing the sequence of actions, and/or one or more environmental conditions that indicate that a user typically performs the sequence of actions subsequent to the trigger event. At step 635, the application is rendered in accordance with the rendering type.

Figure 7:
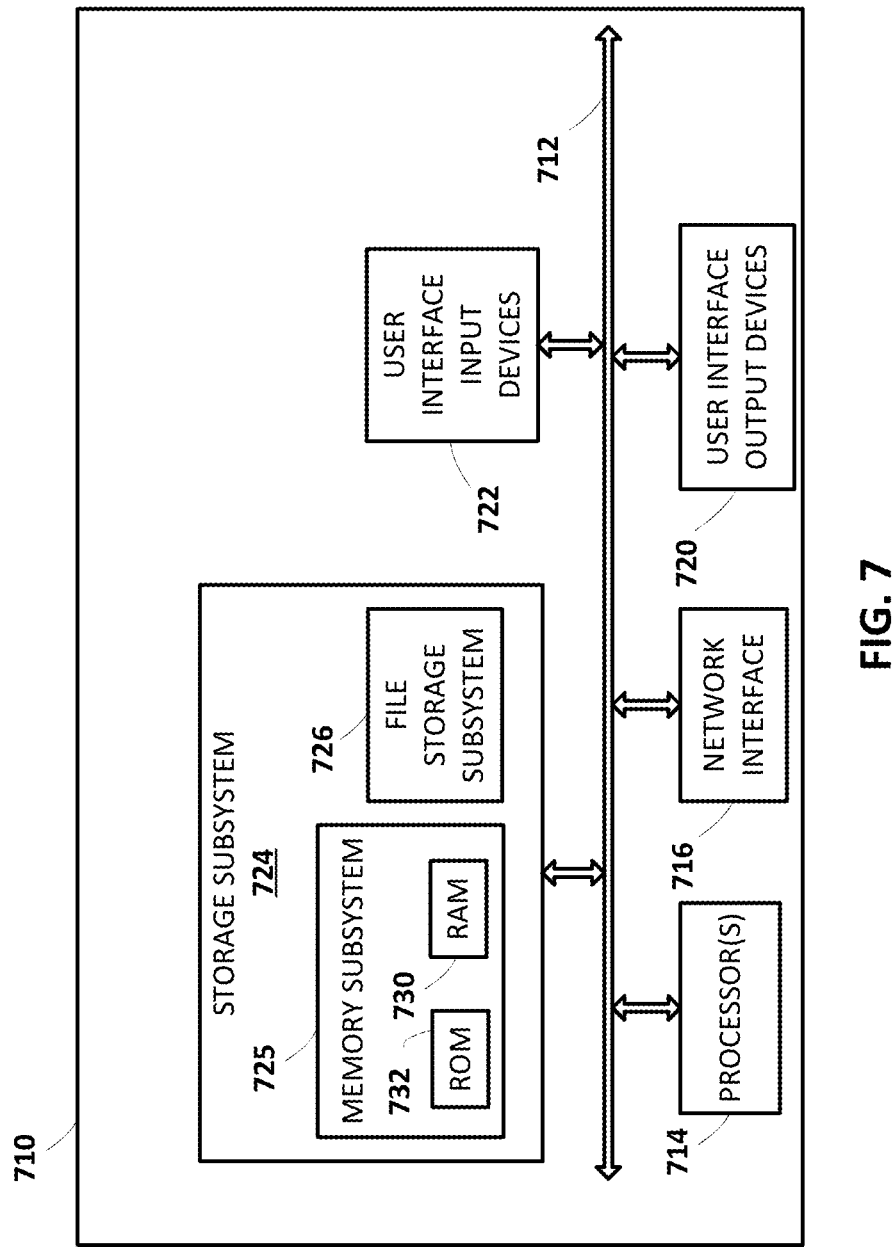
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 3, and/or to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method implemented by one or more processors is provided and includes identifying a plurality of instances of a user performing an action, wherein the action is performed via an application, and wherein the action is at least a portion of a sequence of actions, determining, based on the instances, one or more user interactions initiated by the user while performing the action, wherein a given user interaction indicates a specified input of the user while performing one or more of the actions, generating, based on a quantity of each specified input for a given user interaction, a confidence metric, selecting, based on the confidence metrics, a corresponding rendering type for the application while performing the action, wherein the corresponding rendering type indicates a format to utilize while rendering the application via one or more output devices, storing the sequence of actions with an association to the corresponding rendering type, receiving a request to execute the sequence of actions, and rendering the application in accordance with the rendering type.

These and other implementations of the technology disclosed herein can include one or more of the following features.

In some implementations, the method further includes determining a primary confidence metric of the confidence metrics that satisfies a threshold, wherein selecting the rendering type includes selecting a rendering type that does not visually render at least a portion of the application, and wherein rendering the application includes rendering in accordance with the specified input that corresponds to the primary confidence metric.

In some implementations, the method further includes determining that the confidence metrics do not satisfy a threshold, wherein selecting the rendering type includes selecting a rendering type that renders an interface of the application.

In some implementations, the rendering type includes an option for the user to initiate execution of a next action.

In some implementations, the rendering type includes a countdown before executing the application in accordance with a selected input of the specified inputs.

In some implementations, the method further includes receiving a confirmation to render the application in accordance with the selected input, wherein the application is rendered in response to receiving the confirmation. In some of those implementations, the confirmation is the countdown expiring without user input.

In some implementations, a rendering type includes a summary of information from the application.

In some implementations, selecting the corresponding rendering type is further based on an application type for the application.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, the method comprising:
   identifying a plurality of instances of a user performing an action, wherein the action is performed via an application, and wherein the action is at least a portion of a sequence of actions;
   determining, based on the instances, one or more user interactions initiated by the user while performing the action, wherein a given user interaction indicates a specified input of the user while performing one or more of the actions;
   generating, based on a quantity of each specified input for a given user interaction, a confidence metric;
   selecting, based on the confidence metrics, a corresponding rendering type for the application while performing the action, wherein the corresponding rendering type indicates a format to utilize while rendering the application via one or more output devices;
   storing the sequence of actions with an association to the corresponding rendering type;
   receiving a request to execute the sequence of actions; and
   rendering the application in accordance with the rendering type.

2. The method of claim 1, further comprising:
   determining a primary confidence metric of the confidence metrics that satisfies a threshold, wherein selecting the rendering type includes selecting a rendering type that does not visually render at least a portion of the application, and wherein rendering the application includes rendering in accordance with the specified input that corresponds to the primary confidence metric.

3. The method of claim 1, further comprising:
   determining that the confidence metrics do not satisfy a threshold, wherein selecting the rendering type includes selecting a rendering type that renders an interface of the application.

4. The method of claim 1, wherein the rendering type includes an option for the user to initiate execution of a next action.

5. The method of claim 1, wherein the rendering type includes a countdown before executing the application in accordance with a selected input of the specified inputs.

6. The method of claim 5, further comprising:
   receiving a confirmation to render the application in accordance with the selected input, wherein the application is rendered in response to receiving the confirmation.

7. The method of claim 5, wherein the confirmation is the countdown expiring without user input.

8. The method of claim 1, wherein a rendering type includes a summary of information from the application.

9. The method of claim 1, wherein selecting the corresponding rendering type is further based on an application type for the application.

10. A system, comprising:
    one or more computers each including at least one processor and a memory storing processor-executable code, the one or more computers configured to:
    identify a plurality of instances of a user performing an action, wherein the action is performed via an application, and wherein the action is at least a portion of a sequence of actions;
    determine, based on the instances, one or more user interactions initiated by the user while performing the action, wherein a given user interaction indicates a specified input of the user while performing one or more of the actions;
    generate, based on a quantity of each specified input for a given user interaction, a confidence metric;
    select, based on the confidence metrics, a corresponding rendering type for the application while performing the action, wherein the corresponding rendering type indicates a format to utilize while rendering the application via one or more output devices;
    store the sequence of actions with an association to the corresponding rendering type;
    receive a request to execute the sequence of actions; and
    render the application in accordance with the rendering type.

11. The system of claim 10, wherein the instructions further includes instructions to:
    determine a primary confidence metric of the confidence metrics that satisfies a threshold, wherein selecting the rendering type includes selecting a rendering type that does not visually render at least a portion of the application, and wherein rendering the application includes rendering in accordance with the specified input that corresponds to the primary confidence metric.

12. The system of claim 10, wherein the instructions further includes instructions to:
  determining that the confidence metrics do not satisfy a threshold, wherein selecting the rendering type includes selecting a rendering type that renders an interface of the application.

13. The method of claim 10, wherein the rendering type includes rendering an option for the user to initiate execution of a next action.

14. The system of claim 10, wherein the rendering type includes a countdown before executing the application in accordance with a selected input of the specified inputs.

15. The system of claim 10, wherein the instructions further includes instructions to:
  receiving a confirmation to render the application in accordance with the selected input, wherein the application is rendered in response to receiving the confirmation.

16. The system of claim 15, wherein the confirmation is the countdown expiring without user input.

17. A non-transitory processor-readable medium having instructions stored thereon, which when executed by one or more processors, cause the one or more processors to implement a method, comprising:
  identifying a plurality of instances of a user performing an action, wherein the action is performed via an application, and wherein the action is at least a portion of a sequence of actions;
  determining, based on the instances, one or more user interactions initiated by the user while performing the action, wherein a given user interaction indicates a specified input of the user while performing one or more of the actions;
  generating, based on a quantity of each specified input for a given user interaction, a confidence metric;
  selecting, based on the confidence metrics, a corresponding rendering type for the application while performing the action, wherein the corresponding rendering type indicates a format to utilize while rendering the application via one or more output devices;
  storing the sequence of actions with an association to the corresponding rendering type;
  receiving a request to execute the sequence of actions; and
  rendering the application in accordance with the rendering type.

18. The non-transitory processor-readable medium of claim 17, wherein the method further includes:
  determining a primary confidence metric of the confidence metrics that satisfies a threshold, wherein selecting the rendering type includes selecting a rendering type that does not visually render at least a portion of the application, and wherein rendering the application includes rendering in accordance with the specified input that corresponds to the primary confidence metric.

19. The non-transitory processor-readable medium of claim 17, wherein the method further includes:
  determining that the confidence metrics do not satisfy a threshold, wherein selecting the rendering type includes selecting a rendering type that renders an interface of the application.

20. The non-transitory processor-readable medium of claim 18, wherein the rendering type includes a countdown before executing the application in accordance with a selected input of the specified inputs.

* * * * *